Figure 1:
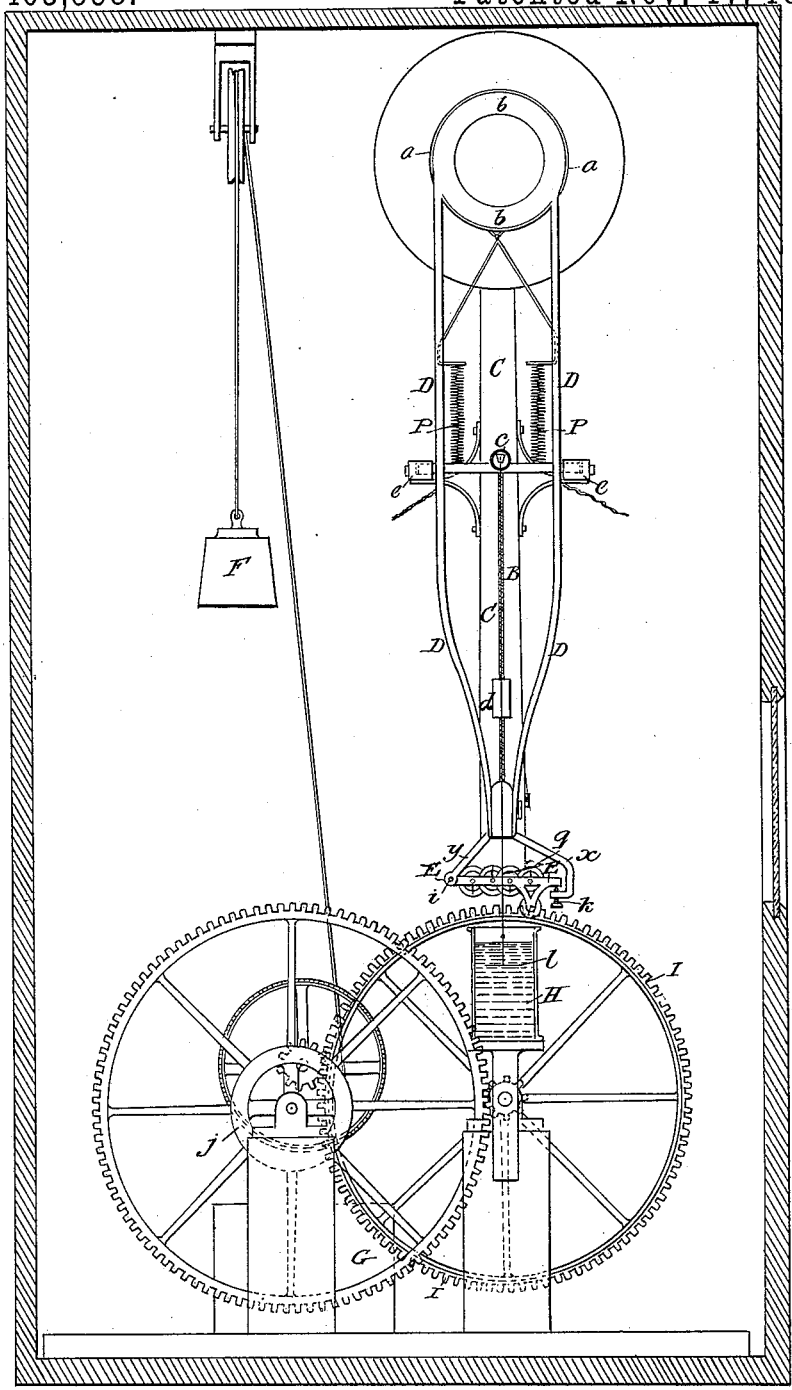

(No Model.) 3 Sheets—Sheet 2.

W. THOMSON.
APPARATUS FOR MEASURING AND RECORDING ELECTRIC CURRENTS.

No. 463,558. Patented Nov. 17, 1891.

Attest:
George E. Cruse.
Harry S. Robin.

Inventor:
William Thomson
by Knight Bros
Attys.

(No Model.) 3 Sheets—Sheet 3.

W. THOMSON.
APPARATUS FOR MEASURING AND RECORDING ELECTRIC CURRENTS.

No. 463,558. Patented Nov. 17, 1891.

Attest:
George E. Bruce.
Harry S. Cohen.

Inventor:
William Thomson
by Knight Bros.
Attys.

UNITED STATES PATENT OFFICE.

WILLIAM THOMSON, OF GLASGOW, SCOTLAND.

APPARATUS FOR MEASURING AND RECORDING ELECTRIC CURRENTS.

SPECIFICATION forming part of Letters Patent No. 463,558, dated November 17, 1891.

Application filed February 18, 1891. Serial No. 381,864. (No model.) Patented in England October 8, 1889, No. 15,769; in France August 9, 1890, No. 207,525; in Belgium August 11, 1890, No. 91,589, and in Italy August 18, 1890, No. 136.

*To all whom it may concern:*

Be it known that I, Sir WILLIAM THOMSON, professor of natural philosophy in the University of Glasgow, residing at Glasgow, in the county of Lanark, North Britain, have invented an Apparatus for Measuring and Recording Electric Currents, (for which I have obtained Letters Patent in Great Britain, No. 15,769, dated October 8, 1889; in France, No. 207,525, dated August 9, 1890; in Belgium, No. 91,589, dated August 11, 1890, and in Italy No. 136, dated August 18, 1890,) of which the following is a specification.

This apparatus consists of a movable body which, for brevity, I shall call the "indicator," carrying a scale or pointer and a recorder, wheel-work to actuate the recorder, an electric motor or clock-work to keep the wheel-work in motion, and electric conductors for the currents actuating the indicator.

The indicator is a body caused to take different positions according to the different strengths of the currents to be measured. It may be soft iron or a steel magnet actuated as in known forms of instruments for measuring alternate or direct currents. For measuring either alternate or direct currents I prefer for indicator a movable frame carrying a coil of insulated wire supported on knife-edges. To vary and adjust the sensibility and zero of the indicator, I use weights adjustable by screws or slides on two bars in directions at right angles to one another fixed to the indicator, so that one of them is vertical or nearly so when the indicator is in its zero position. I vary the sensibility by adjusting the weight on the vertical bar, and to test it I hang a weight on a knife-edge at the extremity of the horizontal bar. The indicator carries a graduated scale or a pointer by which its position is read off by a fixed pointer or on a fixed graduated scale. The scale may be graduated to equal divisions or to divisions corresponding to ampères or decimals of an ampère by comparison with one of my standard balances or other apparatus for absolute measurement of electric currents.

The recorder consists of a frame supported on the indicator by a spring or jointed mounting, allowing it relative motion perpendicular to the motion of the indicator. The frame carries a train of wheels for counting the turns of a very small roller. A cam having its axis perpendicular to the axis round which the indicator turns and as nearly as may be parallel to the motion of the recorder touches the small roller of the recorder periodically— once every six minutes, for example. The acting surface of the cam in different planes perpendicular to its axis extends through a greater or a less portion of the circumference in proportion to the strength of the current required to bring the indicator to the corresponding positions. Thus the roller is kept in action for a longer or shorter time of every period and is turned to an extent proportional to the strength of the current at the instant when the cam commences its action. Thus the total quantity of the electricity which has passed is read off on the wheel-work which is mounted on the recorder-frame. The movable coil of the indicator is acted on by one or by two fixed coils, through which the current to be measured flows. The movable coil may also carry the current to be measured; but when the apparatus is employed as a meter for electric light I prefer to give it a current from the mains through a highly-resisting fixed conductor. To render the apparatus applicable to alternate currents as well as to direct currents, this conductor ought to have resistance several times greater than that of the movable coil, and to have an anti-inductive configuration, and whether for direct or alternate currents its resistance ought to have but small temperature-variation, and it ought to expose as large a surface as may be to the air to get quit of the heat. I therefore make it of fine platinoid wire wound in parallel lines on two sides of a square or oblong of thin insulating material, such as glass or slate, or of a number of such squares or oblongs. The motor is provided with a governor to properly regulate the speed.

Figure 2:
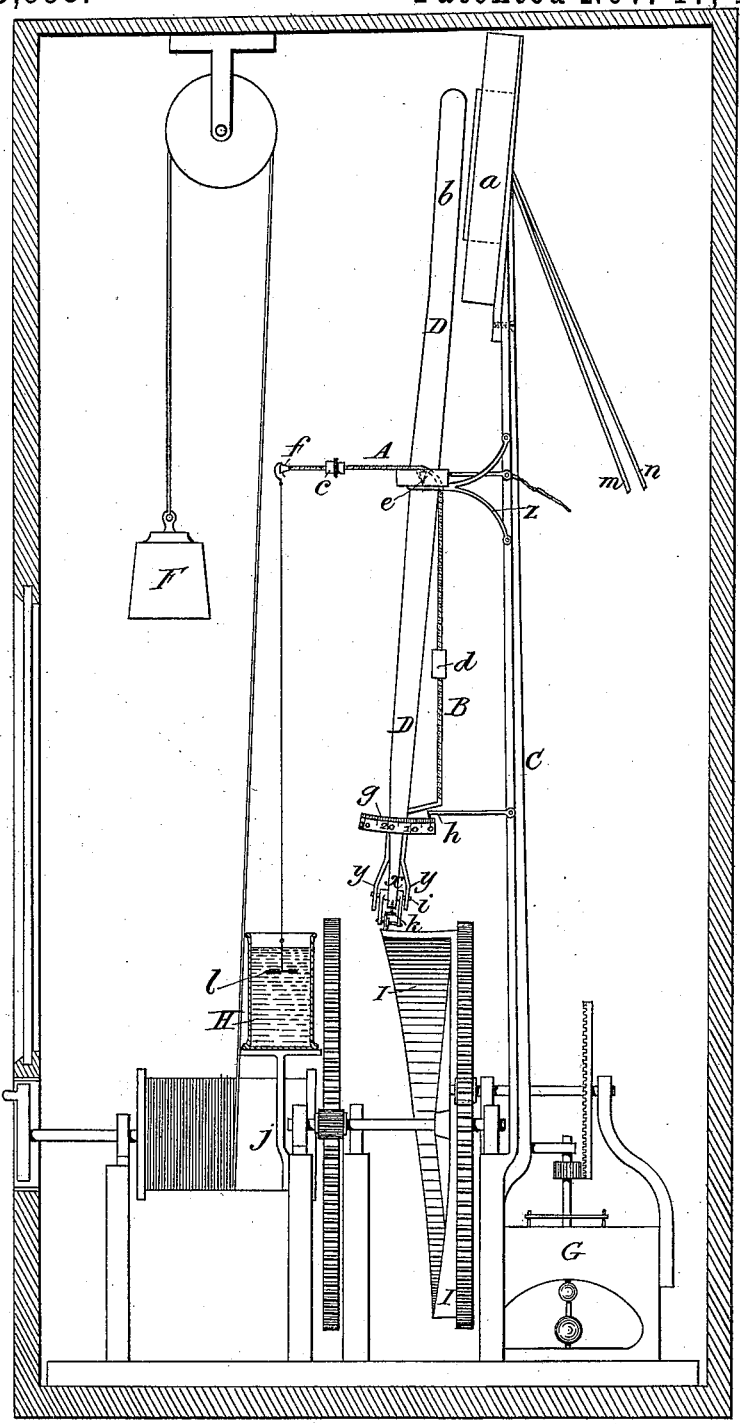
Figure 3:
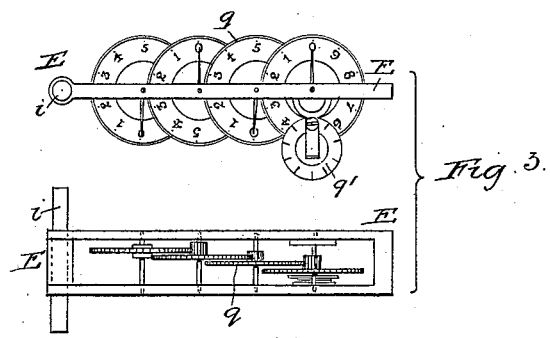
Figure 4:
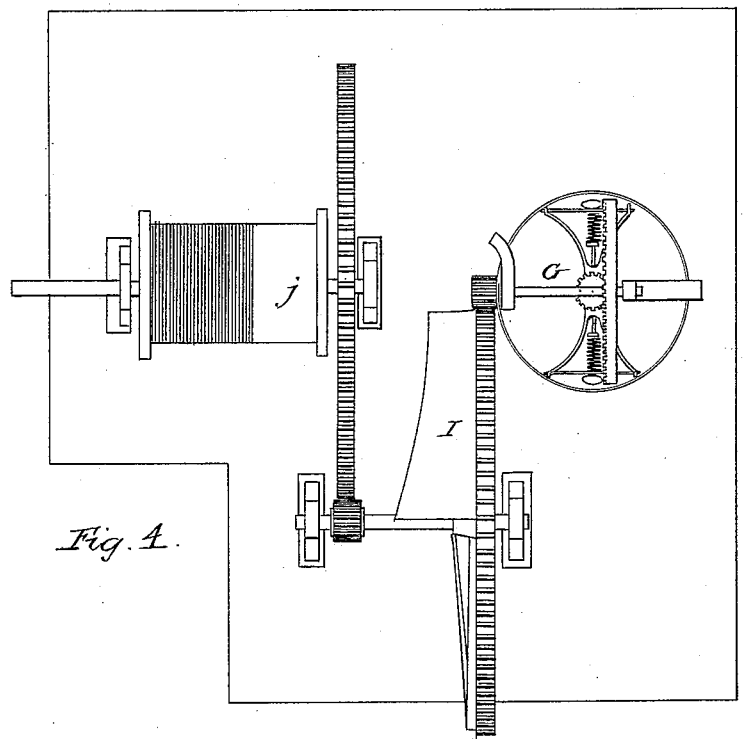

In the drawings, Figure 1 is a front elevation. Fig. 2 is an end elevation. Fig. 3 is an elevation and plan of the recorder. Fig. 4 is a plan of the wheel-work.

The indicator is shown at $b\ b\ D\ D\ y\ x$, Figs. 1 and 2. It carries the coil of fine insulated wire $b\ b$ at its top. Two straight bars A B, Figs. 1 and 2, are attached to the indicator in directions at right angles to one another and preferably so placed that B is vertical or nearly so when, as shown in Fig. 2, the indicator is in its zero position. These bars carry weights $c$ and $d$, each of which is adjustable by screw or slide to different positions along its bar. The bar A has at its outer end the knife-edge $f$ fixed, on which a weight can be hung to test the sensibility of the system. Thus the user can at any time accurately readjust the instrument if by accident or otherwise it has got out of adjustment. On the knife-edge $f$ hangs, by a hook and fine thread, a horizontal disk $l$, submerged in a vessel H of oil or other viscous liquid, the arrangement constituting a dash-pot to check the vibrations of the indicator. The graduated scale and pointer by which the position of the indicator can be read off are shown at $g$ $h$, Fig. 2.

The recorder is shown at E E in Fig. 1. It is shown in elevation and plan in Fig. 3. It is pivoted onto the lower end of the indicator by the axle $i$, Figs. 1, 2, and 3, supported by the bracket $y$. It consists of a train of small counting-wheels $q$ for counting the revolutions of the small roller $q'$, against which the cam presses periodically. A screw $k$ prevents the recorder from falling too low when it leaves contact with the cam I I.

The wheel-work for actuating the recorder is shown below the indicator and recorder in Figs. 1 and 2, and is shown separately in plan in Fig. 4. The weight F, acting by a cord on the drum $j$, keeps the system in motion, which is maintained uniform by the centrifugal governor G.

The cam from whose surface the rolling wheel of the recorder is driven is shown at I I in Figs. 1, 2, and 3.

The whole current to be measured passes through the thick copper coil $a$, Figs. 1 and 2, into which it is conducted by heavy copper conductors $m$ $n$, Fig. 2. The coil $a$ is supported from the base of the instrument by the upright C. The circuit of the fine coil $b$ $b$ is completed through electrodes fixed on the indicator and springs P P, of which the lower ends are joined to fixed electrodes. The current through it may be produced either by the supply-conductors of the electric-lighting system or by an independent source.

I claim—

1. The instrument for measuring and recording electric currents, comprising the right-angularly-arranged straight bars having adjustable weights, and the indicator having connection with one of said bars, and the recorder pivoted to the lower end of the indicator by an axle supported by a suspended bracket, substantially as set forth.

2. In an instrument for recording and measuring electric currents, the combination of the indicator and recorder pivotally connected together, the cam having contact through an intermediate roller with the recorder, and the suspended bracket having an adjusting-screw connection with the recorder, substantially as set forth.

3. In an instrument for measuring and recording electric currents, the combination of the right-angularly-arranged straight bars having adjustable weights, the indicator having connection with one of said bars, the recorder pivoted at one end to the indicator by an axle supported by a suspended bracket, said bracket also having an adjusting-screw connection with the opposite end of said recorder, and the cam having contact through an intermediate roller with the recorder, substantially as set forth.

In witness whereof I have hereunto set my hand in the presence of two witnesses.

WILLIAM THOMSON.

Witnesses:
 JOHN LIDDLE,
 ARTHUR HARTLEY YUILE,
*Both of 154 St. Vincent Street, Glasgow.*